US011573860B1

(12) United States Patent
Xiang et al.

(10) Patent No.: US 11,573,860 B1
(45) Date of Patent: Feb. 7, 2023

(54) VERIFICATION OF METADATA CONSISTENCY ACROSS SNAPSHOT COPY-ON-WRITE (COW) B+TREE LOGICAL MAPS

(71) Applicant: VMware, Inc., Palo Alto, CA (US)

(72) Inventors: Enning Xiang, San Jose, CA (US); Wenguang Wang, Santa Clara, CA (US); Mrityunjay Kumar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/456,152

(22) Filed: Nov. 22, 2021

(51) Int. Cl.
*G06F 3/06* (2006.01)
*G06F 11/14* (2006.01)

(52) U.S. Cl.
CPC .......... *G06F 11/1435* (2013.01); *G06F 3/067* (2013.01); *G06F 3/0619* (2013.01); *G06F 3/0644* (2013.01); *G06F 3/0664* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| 10,417,190 | B1 * | 9/2019 | Donlan | G06F 16/128 |
| 2011/0307659 | A1 * | 12/2011 | Hans | H03M 7/3084 |
| | | | | 711/E12.001 |
| 2019/0362000 | A1 * | 11/2019 | Lee | G06F 16/2237 |

* cited by examiner

*Primary Examiner* — Brian R Peugh
(74) *Attorney, Agent, or Firm* — Dinsmore & Shohl LLP

(57) ABSTRACT

A method for verifying a consistency of snapshot metadata maintained in an ordered data structure for a plurality of snapshots in a snapshot hierarchy is provided. The method includes identifying a first plurality of nodes maintained in a first ordered data structure for a first snapshot that is a child of a second snapshot; for a first node of the first plurality of nodes, verifying the first node by checking for the first node in a second node map maintained in memory for the second snapshot, wherein the second node map includes a plurality of verified nodes in a second ordered data structure; and based on whether the first node is in the second node map: adding the first node to a first node map maintained in memory for the first snapshot, wherein the first node map includes verified nodes of the first plurality of nodes; or triggering an alarm.

20 Claims, 6 Drawing Sheets

VERIFICATION OF METADATA CONSISTENCY ACROSS SNAPSHOT COPY-ON-WRITE (COW) B+TREE LOGICAL MAPS

BACKGROUND

In the field of data storage, a storage area network (SAN) is a dedicated, independent high-speed network that interconnects and delivers shared pools of storage devices to multiple servers. A virtual SAN (VSAN) may aggregate local or direct-attached data storage devices, to create a single storage pool shared across all hosts in a host cluster. This pool of storage (sometimes referred to herein as a "datastore" or "data storage") may allow virtual machines (VMs) running on hosts in the host cluster to store virtual disks that are accessed by the VMs during their operations. The VSAN architecture may be a two-tier datastore including a performance tier for the purpose of read caching and write buffering and a capacity tier for persistent storage.

The VSAN datastore may manage storage of virtual disks at a block granularity. For example, VSAN may be divided into a number of physical blocks (e.g., 4096 bytes or "4K" size blocks), each physical block having a corresponding physical block address (PBA) that indexes the physical block in storage. Physical blocks of the VSAN may be used to store blocks of data (also referred to as data blocks) used by VMs, which may be referenced by logical block addresses (LBAs). Each block of data may have an uncompressed size corresponding to a physical block. Blocks of data may be stored as compressed data or uncompressed data in the VSAN, such that there may or may not be a one to one correspondence between a physical block in VSAN and a data block referenced by an LBA.

Modern storage platforms, including the VSAN datastore, may enable snapshot features for backup, archival, or data protections purposes. Snapshots provide the ability to capture a point-in-time state and data of a VM to not only allow data to be recovered in the event of failure but restored to known working points. Snapshots may not be stored as physical copies of all data blocks, but rather may entirely, or in part, be stored as pointers to the data blocks that existed when the snapshot was created.

Each snapshot may include its own snapshot metadata, e.g., mapping of LBAs mapped to PBAs, stored concurrently by several compute nodes (e.g., metadata servers). The snapshot metadata may be stored as key-value data structures to allow for scalable input/output (I/O) operations. In particular, a unified logical map B+ tree may be used to manage logical extents for the logical address to physical address mapping of each snapshot, where an extent is a specific number of contiguous data blocks allocated for storing information. A B+ tree is a multi-level data structure having a plurality of nodes, each node containing one or more key-value pairs stored as tuples (e.g., <key, value>). A key is an identifier of data and a value is either the data itself or a pointer to a location (e.g., in memory or on disk) of the data associated with the identifier.

In certain embodiments, the logical map B+ tree may be a copy-on-write (COW) B+ tree (also referred to as an append-only B+ tree). COW techniques improve performance and provide time and space efficient snapshot creation by only copying metadata about where the original data is stored, as opposed to creating a physical copy of the data, when a snapshot is created. Accordingly, when a COW approach is taken and a new child snapshot is to be created, instead of copying the entire logical map B+ tree of the parent snapshot, the child snapshot shares with the parent and, in some cases, ancestor snapshots, one or more extents by having a B+ tree index node, exclusively owned by the child, point to shared parent and/or ancestor B+ tree nodes.

In certain embodiments, to manage nodes shared between a parent snapshot and its descendant snapshot(s) (e.g., child snapshots, grandchild snapshots, etc.), each node in each logical map B+ tree is stamped with a monotonically increased sequence number (SN) when the node is created. Accordingly, nodes owned by a child snapshot (e.g., not shared with an ancestor snapshot, such as a parent snapshot, a grandparent snapshot, etc.) may have a larger SN than nodes owned by an ancestor snapshot. Each snapshot may also be assigned a minimum SN (referred to herein as "min SN"), where the min SN is equal to a smallest SN value among all nodes owned by snapshot.

Thus, a node, in the logical map B+ tree of a snapshot, whose SN is smaller than the min SN assigned to the snapshot, is a node that is not owned by the snapshot, but instead shared with an ancestor snapshot. This may be true for all nodes belonging to each of the snapshots created. However, a violation of this invariant may indicate an inconsistency in the snapshot logical map metadata. Detecting such invariant violations may be necessary to fix such inconsistencies in the snapshot metadata and, in some cases, avoid returning corrupted data to a user.

Traditional approaches for identifying snapshot metadata inconsistencies in the buildup of B+ tree logical maps (e.g., built up using COW techniques), include traversing the B+ tree logical map of each snapshot. In particular, a snapshot hierarchy may include a plurality of snapshots connected in a branch tree structure. The top snapshot of the hierarchy may be referred to as a root snapshot, which has no parent snapshot. Traditional approaches for identifying metadata inconsistencies may begin by traversing the B+ tree logical map of the root snapshot, and traversing through the tree to each child snapshot until all snapshots have been analyzed for inconsistencies. Thus, when analyzing a child snapshot of a parent snapshot which has previously been traversed, one or more nodes in the child snapshot may be determined to have SNs less than a min SN of the child snapshot being analyzed. Based on the structure of the B+ tree, each of these identified nodes may be expected to be found in the parent snapshot of the child snapshot.

To verify these nodes are present in the parent snapshot, the metadata of the parent snapshot may again be re-loaded into memory and traversed to verify this logic. Although the metadata of the parent snapshot may have been previously loaded into memory and traversed, verifying metadata of the child snapshot may require nodes of the parent snapshot to be re-analyzed, thereby duplicating efforts needed to verify snapshot metadata contained in the hierarchy of snapshots. Further, additional resources and processing power may be needed to lookup in the parent snapshot B+ tree logical map, each node of the child snapshot B+ tree logical map expected to be found in the parent snapshot B+ tree logical map, which may adversely affect the performance of the system.

Accordingly, there is a need in the art for improved techniques to verify consistency of snapshot metadata.

It should be noted that the information included in the Background section herein is simply meant to provide a reference for the discussion of certain embodiments in the Detailed Description. None of the information included in this Background should be considered as an admission of prior art.

DETAILED DESCRIPTION

Figure 1:
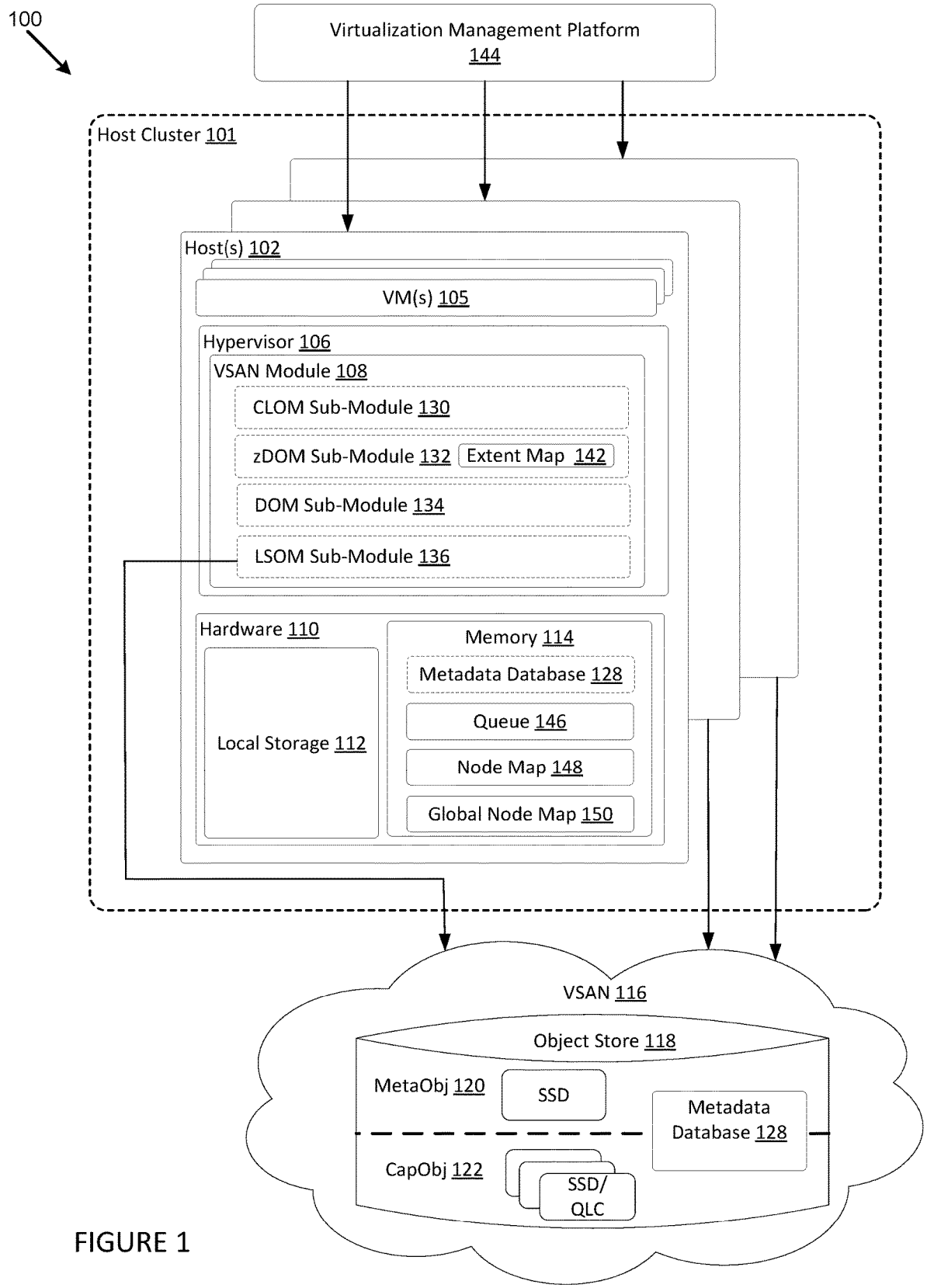
FIG. 1 is a diagram illustrating an example computing environment in which embodiments of the present application may be practiced.

Aspects of the present disclosure introduce techniques for verifying metadata consistency in a hierarchy of snapshots. In particular, a snapshot hierarchy may include a plurality of snapshots connected in a branch tree structure. Each snapshot contained in the snapshot hierarchy may have a parent-child relationship with one or more snapshots in the snapshot hierarchy. A parent snapshot may be a snapshot created during a first backup session, while a child snapshot may be a snapshot created from the parent snapshot in a subsequent backup session, and accordingly, be linked to the parent snapshot. The child snapshot may be created to capture the differences from the parent snapshot when data is modified. The child snapshot then becomes a parent snapshot during an additional backup session where another child snapshot is created, thereby creating the hierarchy of snapshots.

Metadata for each of the snapshots in the snapshot hierarchy may be maintained in several compute nodes of a copy-on-write (COW) B+ tree mapping architecture. As mentioned, COW techniques may be used to build up metadata mapping tables for each snapshot in the snapshot hierarchy. When a COW approach is taken and a new child snapshot, logical map is to be created, instead of copying the entire B+ tree of the parent snapshot, the logical map created for the child snapshot shares metadata of the logical map B+ tree created for the parent snapshot. Accordingly, one or more nodes of the B+ tree belonging to the parent snapshot may be shared with a child snapshot. Overall, the COW B+ tree may be a single COW B+ tree built up for logical maps of each of the snapshots. Each snapshot may have one root node in the COW B+ tree for its logical map.

In some cases, it may be necessary to verify the metadata consistency of logical maps created for each snapshot in the snapshot hierarchy to verify that the metadata is as expected and remains as such. Verifying the metadata consistency may include both (1) verifying that a node that is shared between a child snapshot and a parent snapshot and is expected to be found in a metadata structure (e.g., B+ tree logical map) for the parent snapshot is, in fact, located in the metadata structure belonging to the parent snapshot and (2) verifying that a node that is owned by the child snapshot and is not expected to be found in a metadata structure for the parent snapshot or a sibling snapshot is, in fact, not located in the metadata structure belonging to the parent snapshot, nor located in a metadata structure belonging to a sibling snapshot of the child snapshot. In some examples, this may include (1) verifying a node having a sequence number (SN) smaller than a min SN assigned to a child B+ tree logical map being analyzed is accessible in a B+ tree logical map belonging to its parent snapshot and (2) verifying a node having an SN equal to or larger than a min SN assigned to the child B+ tree logical map being analyzed is not located in a B+ tree logical map belonging to its parent snapshot, nor in a B+ tree logical map belonging to a sibling snapshot.

According to aspects described herein, to efficiently perform such verification, B+ tree logical maps belonging to snapshots in the hierarchy may be analyzed using a breadth first traversal approach beginning at a root snapshot of the snapshot hierarchy. In particular, metadata verification may begin by verifying metadata at a root snapshot in the branch tree structure and verifying metadata for all snapshots at the present depth prior to moving on and verifying metadata for snapshots at the next depth level in the tree data structure. Further, an in-memory node map, and in some cases, a global node map, may be introduced for verification to keep track of each node in each B+ tree logical map that has been verified according to methods described herein. Using a breadth first traversal in combination with the in-memory node map per snapshot, and optionally the global node map, may help to ensure that each snapshot's B+ tree logical map is traversed at most once and also each node in each snapshot's B+ tree logical map is verified at most once. Accordingly, additional resources needed to perform an additional (e.g., second, third, fourth, etc.) verification of metadata in a parent B+ tree logical map when verifying metadata for a B+ tree logical map of each child snapshot of the parent snapshot (e.g., needed when using traditional approaches) may not be necessary using the methods described herein. Thus, aspects herein may provide computational efficiencies over traditional approaches thereby improving performance of the overall system.

Though certain aspects described herein are described with respect to snapshot B+ trees, the aspects may be applicable to any suitable ordered data structure.

FIG. 1 is a diagram illustrating an example computing environment 100 in which embodiments may be practiced. As shown, computing environment 100 may include a distributed object-based datastore, such as a software-based "virtual storage area network" (VSAN) environment, VSAN 116, that leverages the commodity local storage housed in or directly attached (hereinafter, use of the term "housed" or "housed in" may be used to encompass both housed in or otherwise directly attached) to host(s) 102 of a host cluster 101 to provide an aggregate object storage to virtual machines (VMs) 105 running on the host(s) 102. The local commodity storage housed in the hosts 102 may include combinations of solid state drives (SSDs) or non-volatile memory express (NVMe) drives, magnetic or spinning disks or slower/cheaper SSDs, or other types of storages.

Additional details of VSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

As described herein, VSAN 116 is configured to store virtual disks of VMs 105 as data blocks in a number of physical blocks, each physical block having a PBA that indexes the physical block in storage. VSAN module 108 may create an "object" for a specified data block by backing it with physical storage resources of an object store 118 (e.g., based on a defined policy).

VSAN 116 may be a two-tier datastore, storing the data blocks in both a smaller, but faster, performance tier and a larger, but slower, capacity tier. The data in the performance tier may be stored in a first object (e.g., a data log that may also be referred to as a MetaObj 120) and when the size of data reaches a threshold, the data may be written to the capacity tier (e.g., in full stripes, as described herein) in a second object (e.g., CapObj 122) in the capacity tier. SSDs may serve as a read cache and/or write buffer in the performance tier in front of slower/cheaper SSDs (or magnetic disks) in the capacity tier to enhance I/O performance. In some embodiments, both performance and capacity tiers may leverage the same type of storage (e.g., SSDs) for storing the data and performing the read/write operations. Additionally, SSDs may include different types of SSDs that may be used in different tiers in some embodiments. For example, the data in the performance tier may be written on a single-level cell (SLC) type of SSD, while the capacity tier may use a quad-level cell (QLC) type of SSD for storing the data.

Each host 102 may include a storage management module (referred to herein as a VSAN module 108) in order to automate storage management workflows (e.g., create objects in MetaObj 120 and CapObj 122 of VSAN 116, etc.) and provide access to objects (e.g., handle I/O operations to objects in MetaObj 120 and CapObj 122 of VSAN 116, etc.) based on predefined storage policies specified for objects in object store 118.

A virtualization management platform 144 is associated with host cluster 101. Virtualization management platform 144 enables an administrator to manage the configuration and spawning of VMs 105 on various hosts 102. As illustrated in FIG. 1, each host 102 includes a virtualization layer or hypervisor 106, a VSAN module 108, and hardware 110 (which includes the storage (e.g., SSDs) of a host 102). Through hypervisor 106, a host 102 is able to launch and run multiple VMs 105. Hypervisor 106, in part, manages hardware 110 to properly allocate computing resources (e.g., processing power, random access memory (RAM), etc.) for each VM 105. Each hypervisor 106, through its corresponding VSAN module 108, provides access to storage resources located in hardware 110 (e.g., storage) for use as storage for virtual disks (or portions thereof) and other related files that may be accessed by any VM 105 residing in any of hosts 102 in host cluster 101.

VSAN module 108 may be implemented as a "VSAN" device driver within hypervisor 106. In such an embodiment, VSAN module 108 may provide access to a conceptual "VSAN" through which an administrator can create a number of top-level "device" or namespace objects that are backed by object store 118 of VSAN 116. By accessing application programming interfaces (APIs) exposed by VSAN module 108, hypervisor 106 may determine all the top-level file system objects (or other types of top-level device objects) currently residing in VSAN 116.

Each VSAN module 108 (through a cluster level object management or "CLOM" sub-module 130) may communicate with other VSAN modules 108 of other hosts 102 to create and maintain an in-memory metadata database 128 (e.g., maintained separately but in synchronized fashion in memory 114 of each host 102) that may contain metadata describing the locations, configurations, policies and relationships among the various objects stored in VSAN 116. Specifically, in-memory metadata database 128 may serve as a directory service that maintains a physical inventory of VSAN 116 environment, such as the various hosts 102, the storage resources in hosts 102 (e.g., SSD, NVMe drives, magnetic disks, etc.) housed therein, and the characteristics/capabilities thereof, the current state of hosts 102 and their corresponding storage resources, network paths among hosts 102, and the like. In-memory metadata database 128 may further provide a catalog of metadata for objects stored in MetaObj 120 and CapObj 122 of VSAN 116 (e.g., what virtual disk objects exist, what component objects belong to what virtual disk objects, which hosts 102 serve as "coordinators" or "owners" that control access to which objects, quality of service requirements for each object, object configurations, the mapping of objects to physical storage locations, etc.).

In-memory metadata database 128 is used by VSAN module 108 on host 102, for example, when a user (e.g., an administrator) first creates a virtual disk for VM 105 as well as when VM 105 is running and performing I/O operations (e.g., read or write) on the virtual disk.

VSAN module 108, by querying its local copy of in-memory metadata database 128, may be able to identify a particular file system object (e.g., a virtual machine file system (VMFS) file system object) stored in object store 118 that may store a descriptor file for the virtual disk. The descriptor file may include a reference to a virtual disk object that is separately stored in object store 118 of VSAN 116 and conceptually represents the virtual disk (also referred to herein as composite object). The virtual disk object may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

The metadata accessible by VSAN module 108 in in-memory metadata database 128 for each virtual disk object provides a mapping to or otherwise identifies a particular host 102 in host cluster 101 that houses the physical storage resources (e.g., slower/cheaper SSDs, magnetics disks, etc.) that actually stores the physical disk of host 102.

In certain embodiments, VSAN module 108 (and more specifically, zDOM sub-module 132 of VSAN module 108, described in more detail below) may be configured to verify the consistency of snapshot metadata maintained in an ordered data structure, such as, a B+ tree data structure (e.g., a COW B+ tree structure), for a plurality of snapshots in a snapshot hierarchy. According to aspects described herein, VSAN module 108 may be configured to both (1) verify that a node that is shared between a child snapshot and a parent snapshot and is expected to be found in a metadata structure (e.g., B+ tree logical map) for the parent snapshot is, in fact, located in the metadata structure belonging to the parent snapshot and (2) verify that a node that is owned by the child snapshot and is not expected to be found in a metadata structure for the parent snapshot, nor a metadata structure for a sibling snapshot, is, in fact, not located in the metadata structure belonging to the parent snapshot, nor located in the metadata structure belonging to a sibling snapshot. VSAN module 108 may be configured to perform such verification for each snapshot in a snapshot hierarchy.

In certain embodiments, a node map 148 is maintained in memory 114 for each snapshot in the snapshot hierarchy to assist VSAN module 108 in verifying the metadata consistency across snapshots. A node map 148 may be introduced per snapshot to keep track of each node in each B+ tree logical map that has been verified according to methods described herein. As described in more detail below, in-memory node map(s) 148 may help to ensure that each snapshot's B+ tree logical map is traversed at most once and also each node in each snapshot's B+ tree logical map is verified at most once.

Further, in certain embodiments, a global node map 150 may be included in memory 114. Global node map 150 may include one or more nodes belonging to one or more B+ tree logical maps for one or more snapshots. Unlike node map 148 which is associated with a single snapshot, global node map 150 may be used by all snapshots in a snapshot hierarchy. While node map 148 may be used to verify metadata consistency of nodes of a B+ tree logical map of a child snapshot of the parent snapshot, global node map 150 may be used to verify metadata consistency of nodes among sibling snapshots.

In certain embodiments, a queue 146 may also be included in memory 114. Queue 146 may be configured to maintain identifiers of each snapshot in the snapshot hierarchy with metadata that has been verified. Queue 146 may help VSAN module 108 keep track of snapshots with metadata that have been verified and snapshots in the hierarchy that still need to be verified, such that each snapshot is only verified once.

Various sub-modules of VSAN module 108, including, in some embodiments, CLOM sub-module 130, distributed object manager (DOM) sub-module 134, zDOM sub-module 132, and/or local storage object manager (LSOM) sub-module 136, handle different responsibilities. CLOM sub-module 130 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 130 may also be accessed (e.g., to dynamically revise or otherwise update a virtual disk blueprint or the mappings of the virtual disk blueprint to actual physical storage in object store 118) on a change made by a user to the storage profile or policy relating to an object or when changes to the cluster or workload result in an object being out of compliance with a current storage profile or policy.

In one embodiment, if a user creates a storage profile or policy for a virtual disk object, CLOM sub-module 130 applies a variety of heuristics and/or distributed algorithms to generate a virtual disk blueprint that describes a configuration in host cluster 101 that meets or otherwise suits a storage policy. The storage policy may define attributes such as a failure tolerance, which defines the number of host and device failures that a VM can tolerate. A redundant array of inexpensive disks (RAID) configuration may be defined to achieve desired redundancy through mirroring and access performance through erasure coding (EC). EC is a method of data protection in which each copy of a virtual disk object is partitioned into stripes, expanded and encoded with redundant data pieces, and stored across different hosts 102 of VSAN 116 datastore. For example, a virtual disk blueprint may describe a RAID 1 configuration with two mirrored copies of the virtual disk (e.g., mirrors) where each are further striped in a RAID 0 configuration. Each stripe may contain a plurality of data blocks (e.g., four data blocks in a first stripe). Including RAID 5 and RAID 6 configurations, each stripe may also include one or more parity blocks. Accordingly, CLOM sub-module 130, may be responsible for generating a virtual disk blueprint describing a RAID configuration.

CLOM sub-module 130 may communicate the blueprint to its corresponding DOM sub-module 134, for example, through zDOM sub-module 132. DOM sub-module 134 may interact with objects in VSAN 116 to implement the blueprint by allocating or otherwise mapping component objects of the virtual disk object to physical storage locations within various hosts 102 of host cluster 101. DOM sub-module 134 may also access in-memory metadata database 128 to determine the hosts 102 that store the component objects of a corresponding virtual disk object and the paths by which those hosts 102 are reachable in order to satisfy the I/O operation. Some or all of metadata database 128 (e.g., the mapping of the object to physical storage locations, etc.) may be stored with the virtual disk object in object store 118.

When handling an I/O operation from VM 105, due to the hierarchical nature of virtual disk objects in certain embodiments, DOM sub-module 134 may further communicate across the network (e.g., a local area network (LAN), or a wide area network (WAN)) with a different DOM sub-module 134 in a second host 102 (or hosts 102) that serves as the coordinator for the particular virtual disk object that is stored in local storage 112 of the second host 102 (or hosts 102) and which is the portion of the virtual disk that is subject to the I/O operation. If VM 105 issuing the I/O operation resides on a host 102 that is also different from the coordinator of the virtual disk object, DOM sub-module 134 of host 102 running VM 105 may also communicate across the network (e.g., LAN or WAN) with the DOM sub-module 134 of the coordinator. DOM sub-modules 134 may also similarly communicate amongst one another during object creation (and/or modification).

Each DOM sub-module 134 may create their respective objects, allocate local storage 112 to such objects, and advertise their objects in order to update in-memory metadata database 128 with metadata regarding the object. In order to perform such operations, DOM sub-module 134 may interact with a local storage object manager (LSOM) sub-module 136 that serves as the component in VSAN module 108 that may actually drive communication with the local SSDs (and, in some cases, magnetic disks) of its host 102. In addition to allocating local storage 112 for virtual disk objects (as well as storing other metadata, such as policies and configurations for composite objects for which its node serves as coordinator, etc.), LSOM sub-module 136 may additionally monitor the flow of I/O operations to local storage 112 of its host 102, for example, to report whether a storage resource is congested.

zDOM sub-module 132 may be responsible for caching received data in the performance tier of VSAN 116 (e.g., as a virtual disk object in MetaObj 120) and writing the cached data as full stripes on one or more disks (e.g., as virtual disk objects in CapObj 122). To reduce I/O overhead during write operations to the capacity tier, zDOM may require a full stripe (also referred to herein as a full segment) before writing the data to the capacity tier. Data striping is the technique of segmenting logically sequential data, such as the virtual disk. Each stripe may contain a plurality of data blocks; thus, a full stripe write may refer to a write of data blocks that fill a whole stripe. A full stripe write operation may be more efficient compared to the partial stripe write, thereby increasing overall I/O performance. For example, zDOM sub-module 132 may do this full stripe writing to minimize a write amplification effect. Write amplification, refers to the phenomenon that occurs in, for example, SSDs, in which the amount of data written to the memory device is greater than the amount of information you requested to be stored by host 102. Write amplification may differ in different types of writes. Lower write amplification may increase performance and lifespan of an SSD.

In some embodiments, zDOM sub-module 132 performs other datastore procedures, such as data compression and hash calculation, which may result in substantial improvements, for example, in garbage collection, deduplication, snapshotting, etc. (some of which may be performed locally by LSOM sub-module 136 of FIG. 1).

In some embodiments, zDOM sub-module 132 stores and accesses an extent map 142. Extent map 142 provides a mapping of logical block addresses (LBAs) to physical block addresses (PBAs), or LBAs to middle block addresses (MBAs) to PBAs. Each physical block having a corresponding PBA may be referenced by one or more LBAs.

In certain embodiments, for each LBA, VSAN module 108, may store in a logical map of extent map 142, at least a corresponding PBA. The logical map may include an LBA to PBA mapping table. For example, the logical map may store tuples of <LBA, PBA>, where the LBA is the key and the PBA is the value. As used herein, a key is an identifier of data and a value is either the data itself or a pointer to a location (e.g., on disk) of the data associated with the identifier. In some embodiments, the logical map further includes a number of corresponding data blocks stored at a physical address that starts from the PBA (e.g., tuples of <LBA, PBA, number of blocks>, where LBA is the key). In some embodiments where the data blocks are compressed, the logical map further includes the size of each data block compressed in sectors and a compression size (e.g., tuples of <LBA, PBA, number of blocks, number of sectors, compression size>, where LBA is the key).

In certain other embodiments, for each LBA, VSAN module 108, may store in a logical map, at least a corresponding MBA, which further maps to a PBA in a middle map of extent map 142. In other words, extent map 142 may be a two-layer mapping architecture. A first map in the mapping architecture, e.g., the logical map, may include an LBA to MBA mapping table, while a second map, e.g., the middle map, may include an MBA to PBA mapping table. For example, the logical map may store tuples of <LBA, MBA>, where the LBA is the key and the MBA is the value, while the middle map may store tuples of <MBA, PBA>, where the MBA is the key and the PBA is the value. According to the information stored in the logical map, VSAN module 108 may use the logical map to determine which PBA is referenced by an LBA.

Logical maps may also be used in snapshot mapping architecture. Modern storage platforms, including VSAN 116, may enable snapshot features for backup, archival, or data protections purposes. Snapshots provide the ability to capture a point-in-time state and data of a VM 105 to not only allow data to be recovered in the event of failure but restored to known working points. Snapshots may capture VMs' 105 storage, memory, and other devices, such as virtual network interface cards (NICs), at a given point in time. Snapshots do not require an initial copy, as they are not stored as physical copies of data blocks (at least initially), but rather as pointers to the data blocks that existed when the snapshot was created. Because of this physical relationship, a snapshot may be maintained on the same storage array as the original data.

As mentioned, snapshots collected over two or more backup sessions may create a snapshot hierarchy where snapshots are connected in a branch tree structure with one or more branches. Snapshots in the hierarchy have parent-child relationships with one or more other snapshots in the hierarchy. In linear processes, each snapshot has one parent snapshot and one child snapshot, except for the last snapshot, which has no child snapshots. Each parent snapshot may have more than one child snapshot. Additional snapshots in the snapshot hierarchy may be created by reverting to the current parent snapshot or to any parent or child snapshot in the snapshot tree to create more snapshots from that snapshot. Each time a snapshot is created by reverting to any parent or child snapshot in the snapshot tree, a new branch in the branch tree structure is created.

Figure 2:
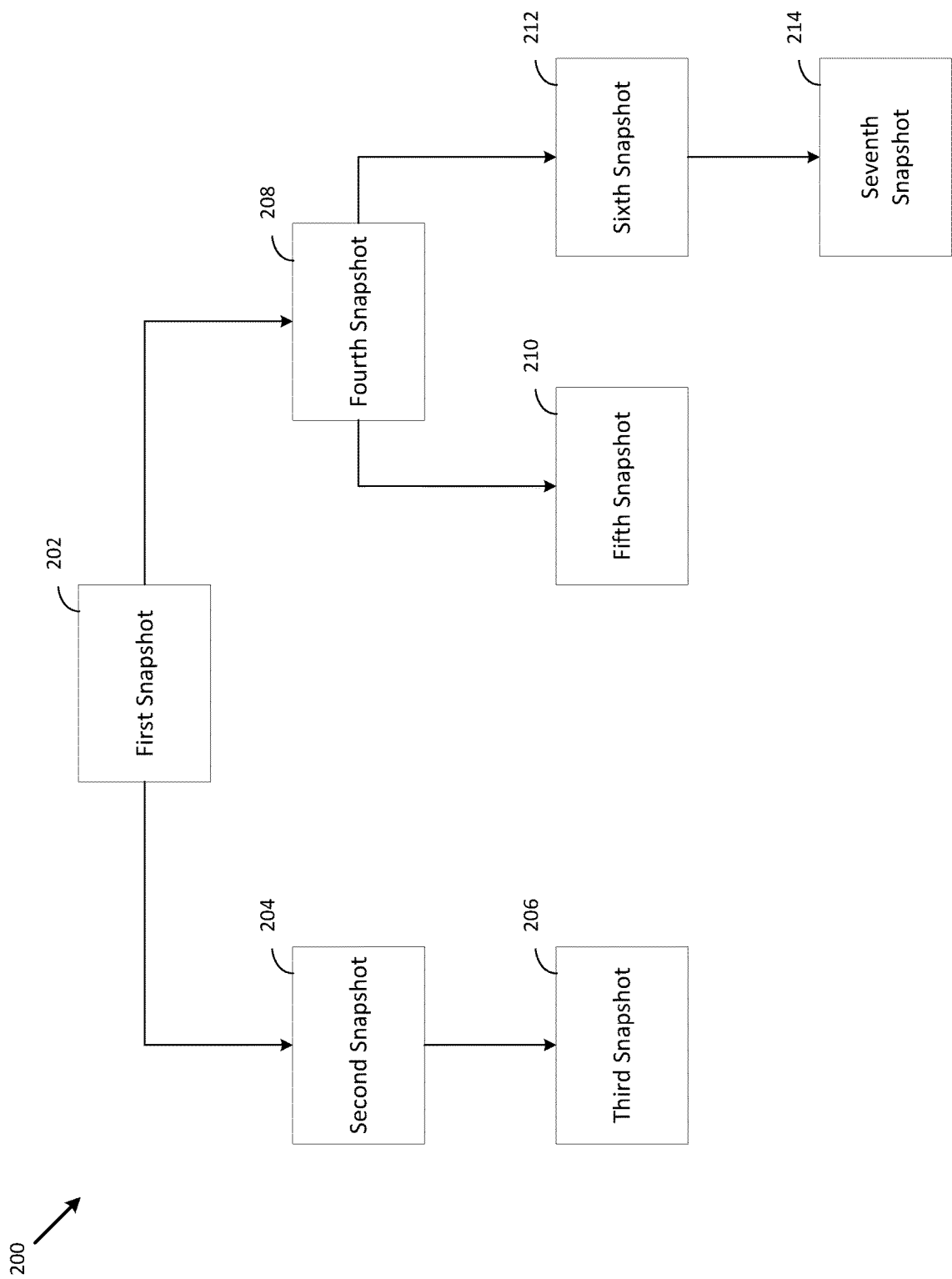
FIG. 2 is a block diagram illustrating an example snapshot hierarchy, according to an example embodiment of the present disclosure.

FIG. 2 is a block diagram illustrating an example snapshot hierarchy 200, according to an example embodiment of the present disclosure. As shown in FIG. 2, seven snapshots may exist in snapshot hierarchy 200. A first snapshot 202 may be a snapshot created first in time. First snapshot 202 may be referred to as a root snapshot of the snapshot hierarchy 200, as first snapshot 202 does not have any parent snapshots. First snapshot 202 may further have two child snapshots: second snapshot 204 and fourth snapshot 208. Fourth snapshot 208 may have been created after reverting back to first snapshot 202 in snapshot hierarchy 200, thereby creating an additional branch from first snapshot 202 to fourth snapshot 208. Second snapshot 204 and fourth snapshot 208 may be considered sibling snapshots. Second snapshot 204 and fourth snapshot 208 may not only be child snapshots of first snapshot 202 but also parent snapshots of other snapshots in snapshot hierarchy 200. In particular, second snapshot 204 may be a parent of third snapshot 206, and fourth snapshot 208 may be a parent of both fifth snapshot 210 and sixth snapshot 212. Third snapshot 206, fifth snapshot 210, and sixth snapshot 212 may be considered grandchildren snapshots of first snapshot 202. Third snapshot 206 and fifth snapshot 210 may not have any children snapshots; however, sixth snapshot 212 may have a child snapshot, seventh snapshot 214. Seventh snapshot 214 may not have any children snapshots in snapshot hierarchy 200.

While FIG. 2 illustrates only seven snapshots in snapshot hierarchy 200, any number of snapshots may be considered as part of a snapshot hierarchy. Further, any parent-child relationships between the snapshots in the snapshot hierarchy may exist in addition to, or alternative to, the parent-child relationships illustrated in FIG. 2.

Each snapshot in the snapshot hierarchy may include its own logical map. In certain embodiments, the logical map of the snapshot extent mapping architecture is a B+ tree. For example, each of the seven snapshots illustrated in FIG. 2 may have their own B+ tree logical map for storing their snapshot metadata.

Figure 3:
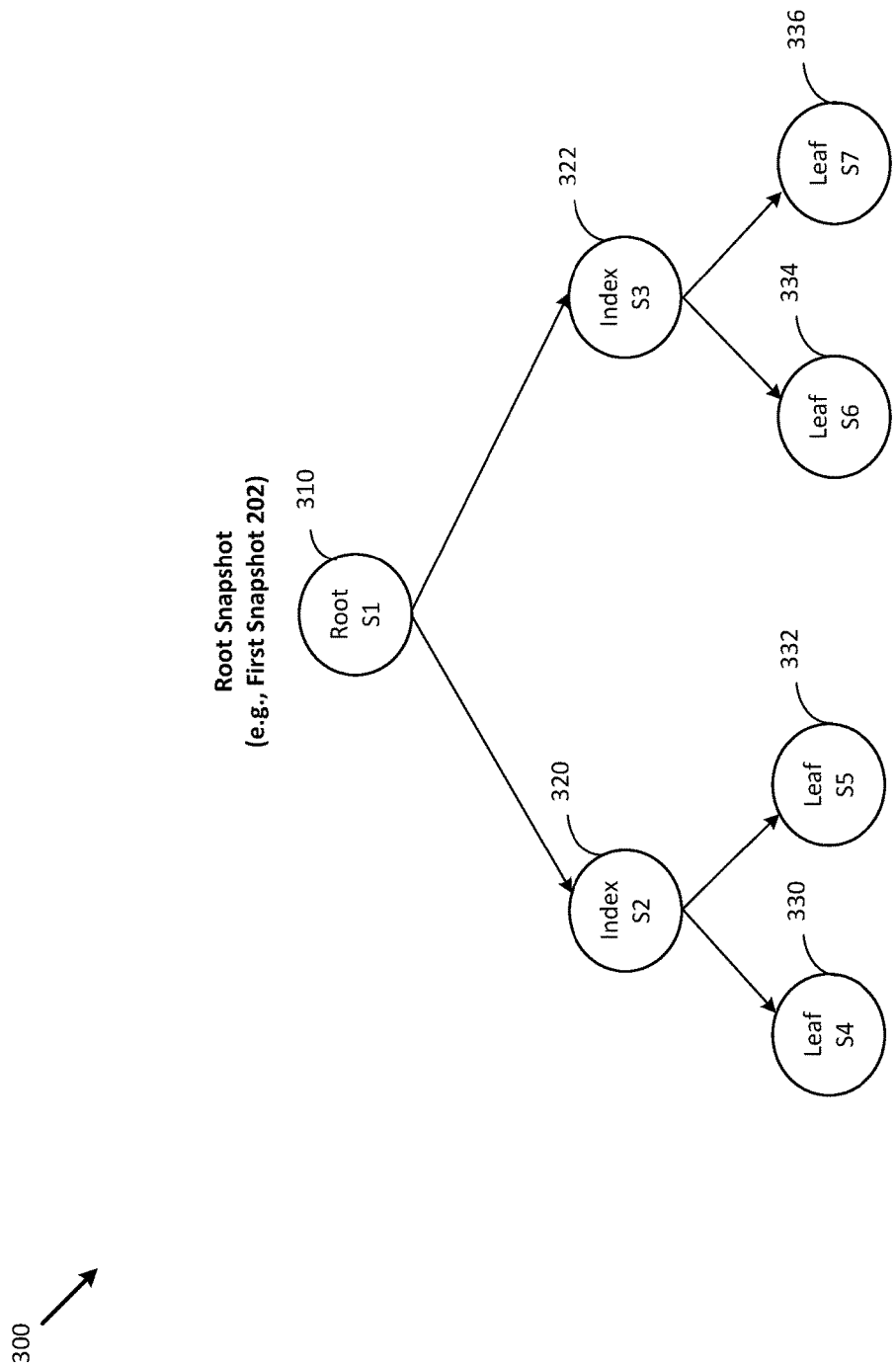
FIG. 3 is a block diagram illustrating a B+ tree data structure, according to an example embodiment of the present disclosure.

FIG. 3 is a block diagram illustrating a B+ tree 300 data structure, according to an example embodiment of the present application. For illustrative purposes, B+ tree 300 may represent the B+ tree logical map for the root snapshot (e.g., first snapshot 202) in snapshot hierarchy 200.

As illustrated, B+ tree 300 may include a plurality of nodes connected in a branching tree structure. The top node of a B+ tree may be referred as a root node, e.g., root node 310, which has no parent node. The middle level of B+ tree 300 may include middle nodes 320 and 322 (also referred to as "index" nodes), which may have both a parent node and one or more child nodes. In the illustrated example, B+ tree 300 has three levels (e.g., level 0, level 1, and level 2), and only a single middle level (e.g., level 1), but other B+ trees may have a greater number of levels with more middle levels and thus greater heights. The bottom level of B+ tree 300 may include leaf nodes 330-336 which do not have any more children nodes. In the illustrated example, in total, B+ tree 300 has seven nodes and three levels. Root node 310 is in level two of the tree, middle (or index) nodes 320 and 322 are in level one of the tree, and leaf nodes 330-336 are in level zero of the tree.

Each node of B+ tree 300 may store at least one tuple. In a B+ tree, leaf nodes may contain data values (or real data) and middle (or index) nodes may contain only indexing keys. For example, each of leaf nodes 330-336 may store at least one tuple that includes a key mapped to real data, or mapped to a pointer to real data, for example, stored in a memory or disk. As shown in FIG. 3, these tuples may correspond to key-value pairs of <LBA, MBA> or <LBA, PBA> mappings for data blocks associated with each LBA. In some embodiments, each leaf node may also include a pointer to its sibling(s), which is not shown for simplicity of description. On the other hand, a tuple in the middle and/or root nodes of B+ tree 300 may store an indexing key and one or more pointers to its child node(s), which can be used to locate a given tuple that is stored in a child node.

Because B+ tree 300 contains sorted tuples, a read operation such as a scan or a query to B+ tree 300 may be completed by traversing the B+ tree relatively quickly to read the desired tuple, or the desired range of tuples, based on the corresponding key or starting key.

According to aspects described herein, each node of B+ tree 300 may be assigned a monotonically increasing SN. For example, a node with a higher SN may be a node which was created later in time than a node with a smaller SN. As shown in FIG. 3, root node 310 may be assigned an SN of S1 as root node 310 belongs to the root snapshot (e.g., first snapshot 202 illustrated in FIG. 2, created first in time) and was the first node created for the root snapshot. Other nodes of B+ tree 300 may similarly be assigned an SN, for example, node 320 may be assigned S2, middle node 322 may be assigned S3, node 330 may be assigned S4, and so forth. As described in more detail below, SNs assigned to each node in the B+ tree snapshot may be used to verify metadata consistency among snapshots in a snapshot hierarchy, such as snapshot hierarchy 200.

In certain embodiments, the B+ tree logical map for each child snapshot in a snapshot hierarchy may be a COW B+ tree (also referred to as an append-only B+ tree). When a COW approach is taken and a child snapshot is created, instead of copying the entire B+ tree logical map of the parent snapshot, the child snapshot shares with the parent and, in some cases, ancestor snapshots, one or more extents by having a B+ tree index node, exclusively owned by the child, point to shared parent and/or ancestor B+ tree nodes. This COW approach for the creation of a child B+ tree logical map may be referred to as a "lazy copy approach" as the entire B+ tree logical map of the parent snapshot is not copied when creating the child B+ tree logical map.

Figure 4:
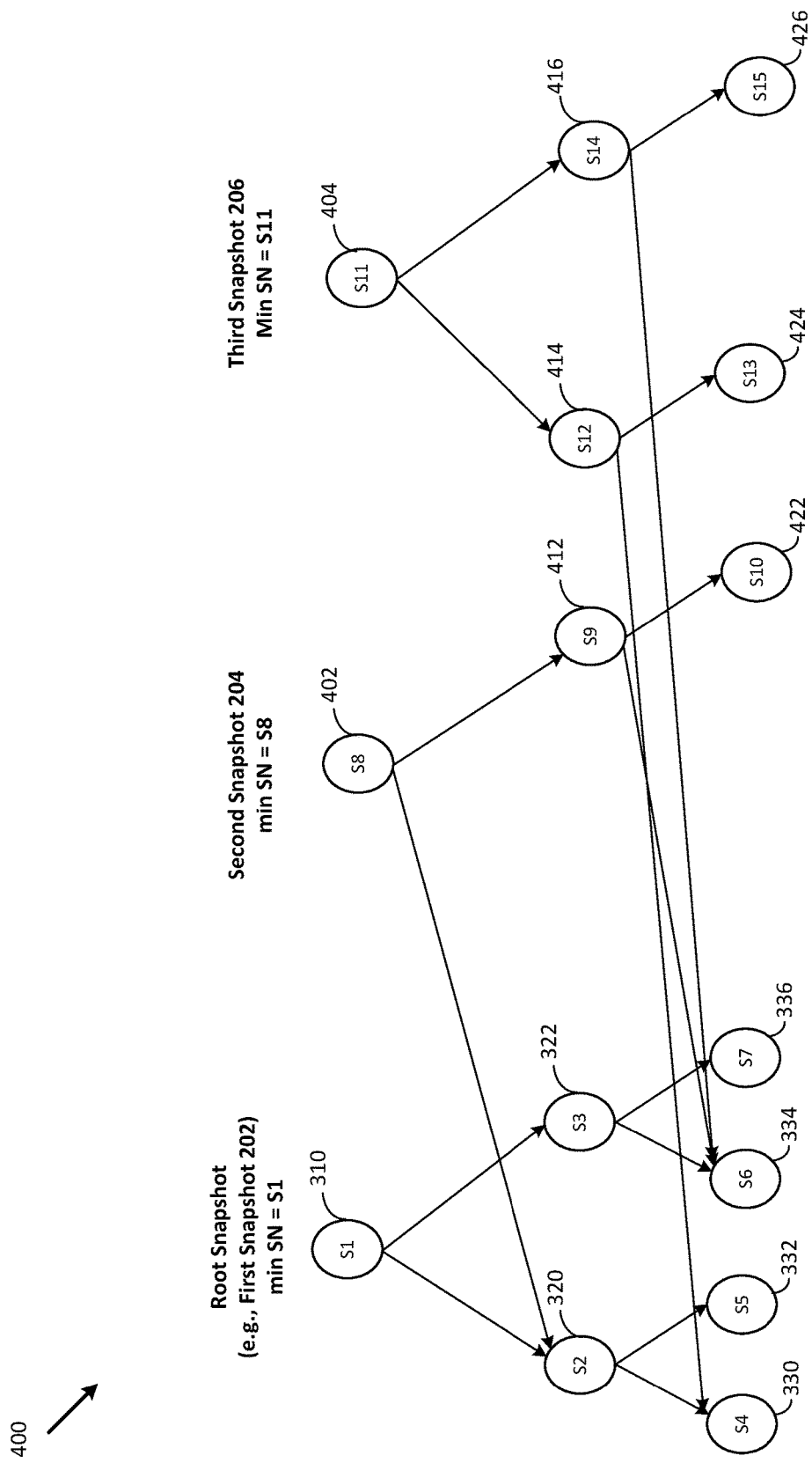
FIG. 4 is a block diagram illustrating a B+ tree data structure using a copy-on-write (COW) approach for the creation of logical map B+ trees for child snapshots in a snapshot hierarchy, according to an example embodiment of the present application

FIG. 4 is a block diagram illustrating a B+ tree data structure 400 using a COW approach for the creation of B+ tree logical maps for child snapshots in a snapshot hierarchy, according to an example embodiment of the present application. For illustrative purposes, B+ tree data structure 400 may represent the B+ tree logical maps for first snapshot 202, second snapshot 204, and third snapshot 206 in snapshot hierarchy 200. Fourth snapshot 208, fifth snapshot 210, sixth snapshot 212, and seventh snapshot 214 have been removed from the illustration of FIG. 4 for simplicity. However, B+ tree logical maps for fourth snapshot 208, fifth snapshot 210, sixth snapshot 212, and seventh snapshot 214 may exist in a similar manner as B+ tree logical maps described for first snapshot 202, second snapshot 204, and third snapshot 206 in FIG. 4.

As shown in FIG. 4, middle node 320 and leaf node 334 are shared by root node 310 of a first B+ tree logical map (e.g., associated with first snapshot 202) and root node 402 of a second B+ tree logical map (e.g., associated with second snapshot 204, which is a child snapshot of first snapshot 202) generated from the first B+ tree logical map. This way, the two root nodes 310 and 402 may share the data of the tree without having to duplicate the entire data of the tree.

More specifically, when the B+ tree logical map for second snapshot 204 was created, the B+ tree logical map for first snapshot 202 was copied and snapshot data for leaf node 336 was overwritten, while leaf nodes 330, 332, and 334 were unchanged. Accordingly, root node 402 in the B+ tree logical map for second snapshot 204 has a pointer to node 320 in the B+ tree logical map for first snapshot 202 for the shared nodes 320, 330, and 332, but, instead of root node 402 having a pointer to middle node 322, middle node 412 was created with a pointer to shared leaf node 334 (e.g., shared between first snapshot 202 and second snapshot 204) and a pointer to new leaf node 422, containing metadata for the overwritten data block. Similar methods may have been used to create the B+ tree logical map for third snapshot 206 illustrated in FIG. 4.

As mentioned, each node of each B+ tree logical map in B+ tree data structure 400 may be assigned a monotonically increasing SN for purposes of checking the metadata consistency of snapshots in B+ tree data structure 400, and more specifically, in snapshot hierarchy 200. Further, the B+ tree logical map for each snapshot in B+ tree data structure 400 may be assigned a min SN, where the min SN is equal to a smallest SN value among all nodes owned by the snapshot. For example, in the example B+ tree data structure 400, first snapshot 202 may own nodes S1-S7; thus, the min SN assigned to the B+ tree logical map of first snapshot 202 may be equal to S1. Similarly, second snapshot 204 may own nodes S8-S10; thus, the min SN of the B+ tree logical map of second snapshot 204 may be equal to S8, and third snapshot 206 may own node S11-S15; thus, the min SN of the B+ tree logical map of third snapshot 206 may be equal to S11.

Accordingly, each node, in the B+ tree logical map of child snapshots 204 and 206 snapshot, whose SN is smaller than the min SN assigned to the B+ tree logical map of the snapshot, may be a node that is not owned by the snapshot, but instead shared with an ancestor snapshot. For example, when traversing through the B+ tree logical map of second snapshot 204, node 320 may be reached. Because node 320 is associated with an SN less than the min SN of second snapshot 204 (e.g., S2<S8), node 320 may be determined to be a node that is not owned by second snapshot 204, but instead owned by first snapshot 202 and shared with second snapshot 204. On the other hand, each node, in the B+ tree logical maps of child snapshots 204 and 206, whose SN is larger than the min SN assigned to the snapshot, may be a node that is owned by the snapshot. For example, when traversing through the B+ tree logical map of second snapshot 204, node 412 may be reached. Because node 412 is associated with an SN greater than the min SN of second snapshot 204 (e.g., S9>S8), node 412 may be determined to be a node that is owned by second snapshot 204. Such rules may be true for all nodes belonging to each of the snapshot B+ tree logical maps created for a snapshot hierarchy, such as snapshot hierarchy 200 illustrated in FIG. 2.

However, in some cases, one or more violations of these rules may exist. In particular, one violation may include a node belonging to one of the snapshot B+ tree logical maps having an SN smaller than a min SN assigned to the B+ tree logical map containing the node, and the node not being accessible in a B+ tree logical map belonging to its parent snapshot. Another violation may include a node belonging to one of the snapshot B+ tree logical maps having an SN greater than or equal to a min SN assigned to the B+ tree logical map containing the node, and the node being accessible in a B+ tree logical map belonging to its parent snapshot (or in some cases a global map, as described in more detail below). Such identified violations in the snapshot hierarchy may indicate inconsistencies in the snapshot logical map metadata.

Detecting such violations allow inconsistencies in the snapshot metadata to be fixed and, in some cases, avoid returning corrupted data to a user. Further, efficient methods for detecting such violations may be desired to reduce input/output (I/O) costs thereby improving the overall snapshot performance. Accordingly, aspects described herein introduce techniques for efficiently verifying metadata consistency in a hierarchy of snapshots. In particular, metadata verification may begin by verifying metadata at a root snapshot in the snapshot hierarchy and verifying metadata for all snapshots at the present depth prior to moving on to snapshots at the next depth level in the snapshot hierarchy. Further, an in-memory node map for each snapshot, as well as, in some cases a global node map, may be introduced to assist in the verification, and more specifically, to keep track of each node in each logical B+ tree that has been verified according to methods described herein.

Using a breadth first traversal in combination with the in-memory node map(s) may help to ensure that each snapshot's B+ tree logical map is traversed at most once and also each node in each snapshot's B+ tree logical map is verified at most once. Accordingly, resources needed to perform an additional (e.g., second, third, fourth, etc.) verification of metadata in a parent B+ tree logical map when verifying metadata for a B+ tree logical map of each child snapshot of the parent snapshot (e.g., needed when using traditional approaches) may not be necessary using the methods described herein. Thus, aspects herein may provide computational efficiencies over traditional approaches thereby improving performance of the overall system.

Figure 5:
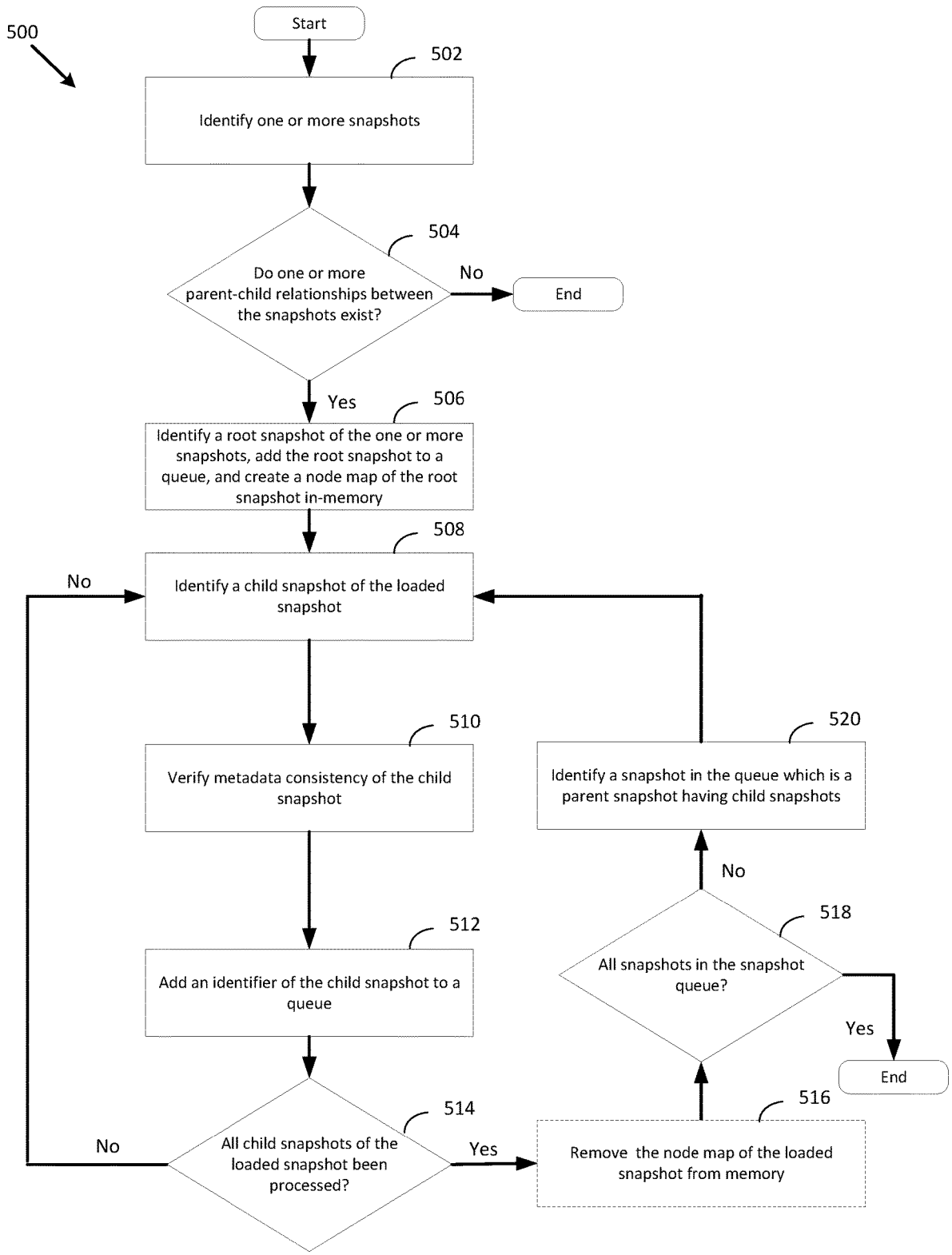
FIG. 5 is an example workflow for detecting invariant violations in each logical map B+ tree corresponding to a snapshot in a snapshot hierarchy, according to an example embodiment of the present disclosure.

FIG. 5 is an example workflow 500 for detecting invariant violations in each B+ tree logical map corresponding to a snapshot in a snapshot hierarchy, according to an example embodiment of the present disclosure. Workflow 500 may be performed by VSAN module 108, and in some cases, zDOM sub-module 132, illustrated in FIG. 1, to verify the metadata consistency of snapshots in the snapshot hierarchy. Operations of workflow 500 may be described with respect to example snapshot hierarchy 200 of FIG. 2.

Workflow 500 may begin, at operation 502, by VSAN module 108 identifying one or more snapshots created during one or more backup sessions. At operation 504, VSAN module 108 determines whether one or more parent-child relationships exist among the identified one or more snapshots. As will be described in more detail below, in some cases, verifying the metadata consistency of a snapshot may include verifying one or more nodes of the snapshot's B+ tree logical map are included, or are not included, in a B+ tree logical map belonging to a parent snapshot of the snapshot. Accordingly, where one or more parent-child relationship(s) are absent, metadata violations among parent-child snapshot logical maps may not exist. Accordingly, where at operation 504, VSAN module 108 determines no parent-child relationships exist, workflow 500 may end. Alternatively, where at operation 504, VSAN module 108 determines one or more parent-child relationships exist, VSAN module 108 proceeds with workflow 500 for verifying metadata consistency of snapshots in the identified parent-child relationship(s).

As an illustrative example using snapshot hierarchy 200 illustrated in FIG. 2, at operation 502, VSAN module 108 identifies seven snapshots: first snapshot 202, second snapshot 204, third snapshot 206, fourth snapshot 208, fifth snapshot 210, sixth snapshot 212, and seventh snapshot 214. At operation 504, VSAN module 108 identifies (1) a first parent-child relationship between first snapshot 202 (e.g., parent snapshot) and second snapshot 204 and fourth snapshot 208 (e.g., children snapshots), (2) a second parent-child relationship between second snapshot 204 and third snapshot 206, (3) a third parent-child relationship between fourth snapshot 208 and fifth snapshot 210 and sixth snapshot 212, and (4) a fourth parent-child relationship between sixth snapshot 212 and seventh snapshot 214.

At operation 506, VSAN module 108 (1) identifies a root snapshot of the one or more snapshots, (2) adds the root snapshot to a snapshot queue, and (3) creates a node map for the root snapshot in memory 114. As mentioned, to efficiently perform metadata verification, B+ tree logical maps belonging to snapshots in the hierarchy may be analyzed using a breadth first traversal approach beginning at a root snapshot of the snapshot hierarchy. Accordingly, a root snapshot may be identified and added to a queue, such as queue 146 illustrated in FIG. 1. In certain aspects, adding the root snapshot to the queue, may include adding an identifier of the root snapshot to queue 146. Queue 146 may be configured to maintain identifiers of each snapshot in the snapshot hierarchy with metadata that has been verified. Queue 146 may help VSAN module 108 keep track of snapshots with metadata that have been verified and snapshots in the hierarchy that still need to be verified, such that each snapshot is only verified once.

To create a node map of the root snapshot, VSAN module 108 may add an identifier of each node of the root snapshot to a node map 148 in memory 114 created for the root snapshot. In certain aspects, the identifier of a node may be a physical address of the node. In certain aspects, the identifier of the node may be the SN assigned to the node. A node map may be created for each snapshot to keep track of each node in a snapshot's B+ tree logical map which has been verified. In some embodiments, the node map is a bitmap where each bit in the bitmap corresponds to a node, an identifier, or SN, and a bit value indicates whether the corresponding node is found in the snapshot B+ tree logical map. Accordingly, creation of a node map for the root snapshot of a snapshot hierarchy may be different than the creation of a node map for other snapshots in the snapshot hierarchy, as all nodes of the B+ tree logical map belonging to the root snapshot are owned by the root snapshot (e.g., an SN assigned to each node in the B+ tree logical map of the root snapshot is equal to or greater than a min SN assigned to the root snapshot) given the root snapshot has no parent snapshot.

Using the example snapshot hierarchy 200, at operation 506, VSAN module 108 identifies first snapshot 202 as the root snapshot of the hierarchy and adds first snapshot 202 (e.g., an identifier of first snapshot 202) to queue 146. VSAN module 108 also creates a node map 148 in memory 114 for first snapshot 202. In particular, VSAN module 108 adds each of the seven nodes (e.g., corresponding to SNs S1-S7) of the B+ tree logical map owned by first snapshot 202 (e.g., as illustrated in FIG. 3 and FIG. 4) to a node map 148 for first snapshot 202. Because first snapshot 202 is the root snapshot of snapshot hierarchy 200, VSAN module 108 may not need to check whether each node of first snapshot 202 (1) exists in a parent snapshot (e.g., where the SN of the node is less than the min SN of first snapshot 202) or (2) does not exist in a parent snapshot (e.g., where the SN of the node is greater than the min SN of the first snapshot).

At operation 508, VSAN module 108 identifies a child snapshot of the loaded snapshot. The loaded snapshot may be a snapshot having its node map 148 loaded in memory 114. In this case, VSAN module 108 identifies a child snapshot of the root snapshot, as node map 148 for the root snapshot is in memory 114. In some cases, the root snapshot may have more than one child snapshot; thus, at operation 508 the identified snapshot may be any snapshot of the one or more child snapshots of the root snapshot. In some cases, VSAN module 108 may use a breadth first traversal approach in identifying a child snapshot of the root snapshot. A breadth first traversal approach may cause VSAN module 108 to move horizontally through each layer of the snapshot hierarchy for identifying child snapshots in that layer. For example, in snapshot hierarchy 200, second snapshot 204 and fourth snapshot 208 are both child snapshots of first snapshot 202 (e.g., the root snapshot). Accordingly, VSAN module 108 identifies either second snapshot 204 or fourth snapshot 208. Using a breadth first search approach, VSAN module 108 may identify second snapshot 204 first, at operation 508.

At operation 510, VSAN module 108 verifies the metadata consistency of the child snapshot identified at operation 508. Verifying the metadata consistency of the child snapshot includes verifying for each node of the B+ tree logical map belonging to the child snapshot that (1) an SN of the node is smaller than a min SN assigned to the B+ tree logical map belonging to the child snapshot, and the node is found in a node map 148 in memory 114 created for its parent snapshot or (2) the SN of the node is greater than or equal to the min SN assigned to the B+ tree logical map belonging to the child snapshot, and the node is not found in the node map 148 in memory 114 created for its parent snapshot (and in some cases, not found in a global node map 150 maintained in memory). In some cases, verifying the metadata consistency of the child snapshot further includes verifying for each node of the B+ tree logical map belonging to the child snapshot that (3) the SN of the node is greater than or equal to the min SN assigned to the B+ tree logical map belonging to the child snapshot, and the node is not found in a global node map 150 in memory 114. In certain aspects, determining whether a node is located in a node map may include determining whether an identifier for the node is in the node map, a physical address of the node is in the node map, an SN for the node is in the node map, etc. Verification of metadata consistency by VSAN module 108 at operation 510 may be explained in more detail with respect to workflow 600 of FIG. 6.

After verifying the metadata consistency of the child snapshot, at operation 510, VSAN module 108 adds an identifier of the child snapshot to queue 146 in memory 114. As mentioned, adding a snapshot to queue 146 indicates that metadata for the snapshot has been verified. Continuing with the example for snapshot hierarchy 200, at operation 510, VSAN module 108 verifies the metadata consistency of second snapshot 204 (e.g., identified at operation 508), and, at operation 512, adds second snapshot 204 to queue 146 such that queue 146 contains both first snapshot 202 and second snapshot 204.

At operation 514, VSAN module 108 determines whether all child snapshots of the loaded snapshot have been processed. In cases where VSAN module 108 determines not all child snapshots of the loaded snapshot have been processed, VSAN module 108 returns to operation 508. VSAN module 108 may then repeat operations 508 through 514 for another child snapshot of the loaded snapshot which has not been processed. For example, at operation 514, using example snapshot hierarchy 200, VSAN module 108 may determine not all child snapshots of first snapshot 202 (e.g., loaded snapshot) have been processed. In other words, VSAN module 108 may determine metadata for all child snapshots of first snapshot 202 have not been processed. Because only metadata for child snapshot, second snapshot 204, has been verified, at operation 508, the next child snapshot identified by VSAN module 108 may be the other child snapshot of first snapshot 202, e.g., fourth snapshot 208. Accordingly, VSAN module 108 may repeat operations 510 and 512 for fourth snapshot 208.

Thus, when returning to operation 514, VSAN module 108 may determine all child snapshots of first snapshot 202 have been processed. Specifically, first snapshot 202 has two child snapshots, second snapshot 204 and fourth snapshot 208, and metadata for each of these snapshots has been verified. As will be described in more detail with respect to FIG. 6, at this point, three node maps 148 may exist in memory 114 corresponding to first snapshot 202, second snapshot 204, and fourth snapshot 208, respectively.

Optionally, at operation 516, VSAN module 108 may remove node map 148 for the loaded snapshot (e.g., the root snapshot, first snapshot 202) from memory 114. Removing node map 148 may free up RAM thereby improving performance of metadata consistency verification by VSAN module 108. In the illustrative example, removing node map 148 for first snapshot 202 from memory 114 may cause only a node map 148 for second snapshot 204 and a node map 148 for fourth snapshot 208 to remain in memory 114.

At operation 518, VSAN module 108 may determine whether all snapshots of the snapshot hierarchy are in queue 146. As mentioned, the purpose of queue 146 is to keep track of snapshots with metadata that have been verified and snapshots in the hierarchy that still need to be verified, such that each snapshot is only verified once. Where metadata of all snapshots of the snapshot hierarchy have been verified, queue 146 may include an identifier for each of these snapshots. However, where metadata for one or more snapshots of the snapshot hierarchy have not been verified, queue 146 may not contain an identifier for these snapshots. Accordingly, at operation 518, where VSAN module 108 determines that identifiers for all snapshots in the snapshot hierarchy are in queue 146, workflow 500 is complete, as metadata for each snapshot in the snapshot hierarchy has been verified. On the other hand, at operation 518, where VSAN module 108 determines that one or more identifiers of snapshots in the snapshot hierarchy are not in queue 146, VSAN module may continue to operation 520.

According to the illustrative example, VSAN module 108 may determine, at operation 518, that all snapshots in snapshot hierarchy 200 are not in queue 146. More specifically, at this point, only an identifier for first snapshot 202, an identifier for second snapshot 204, and an identifier for fourth snapshot 208 may exist in queue 146 (e.g., based on adding first snapshot to queue 146 at operation 506 and adding second snapshot 204 and fourth snapshot 208 to queue 146 at operation 512). Because identifiers for the remaining snapshots in snapshot hierarchy 200 (e.g., an identifier for third snapshot 206, fifth snapshot 210, sixth snapshot 212, and seventh snapshot 214) do not exist in queue 146, VSAN module 108 may determine that metadata for all snapshots in snapshot hierarchy have not been verified and proceed to operation 520.

At operation 520, VSAN module 108 identifies and selects a snapshot in queue 146 which is a parent snapshot having child snapshots, and more specifically, a parent snapshot having child snapshot(s) with metadata that have not been verified. For example, VSAN module 108 may determine that an identifier for each of the first snapshot 202, second snapshot 204, and fourth snapshot 208 exists in queue 146. At operation 520, VSAN module 108 may identify second snapshot 204 is a parent snapshot in queue 146 having a child snapshot (e.g., third snapshot 206) with metadata that has not been verified. Additionally, at operation 520, VSAN module 108 may identify fourth snapshot 208 is a parent snapshot in queue 146 having child snapshots with metadata that have not been verified. Accordingly, VSAN module 108 may select either of second snapshot 204 or fourth snapshot 208 at operation 520, and further proceed to operation 522. In some cases, VSAN module 108 may use a breadth first traversal approach in selecting a snapshot at operation 520. Thus, when using the breadth first traversal approach, VSAN module 108 may identify second snapshot 204 first, at operation 520.

Accordingly, VSAN module 108 at operation 508 selects third snapshot 206 (e.g., where the loaded snapshot is now considered to be the snapshot selected at operation 520), and at operation 510, verifies the metadata consistency of the B+ tree logical map maintained for third snapshot 206. In particular, at operation 510, VSAN module 108 uses the node map of third snapshot 206's parent snapshot (e.g. node map for second snapshot 204, stored in memory 144) to verify metadata consistency of a B+ tree logical map belonging to third snapshot 206. Using a node map of a parent snapshot for verifying metadata consistency of a child snapshot of the parent snapshot may be described in more detail with respect to FIG. 6.

At operation 512, VSAN module 108 adds an identifier of third snapshot 206 to queue 146. Again, at operation 514, VSAN module identifies all child snapshots of first snapshot 202 (e.g., the loaded snapshot) have been processed. At operation 516, VSAN module 108 may, in some cases, remove node map 148 associated with first snapshot 202 in memory 114. At operation 518, VSAN module 108 may again determine whether all snapshots of the snapshot hierarchy are now in queue 146, now that third snapshot 206 has been processed and added to queue 146 (e.g., at operation 512).

In the illustrative example, VSAN module 108 may determine that an identifier for each of fifth snapshot 210, sixth snapshot 212, and seventh snapshot 214 in snapshot hierarchy 200 is still not present in queue 146. Accordingly, VSAN module 108 may repeat operations 508-522 to verify metadata maintained for each of these snapshots, and further add an identifier of each of these snapshots to queue 146.

When all identifiers of snapshots in snapshot hierarchy 200 are in queue 146, VSAN module 108 determines metadata of each snapshot in snapshot hierarchy 200 has been verified and, thus, workflow 500 may be complete.

Figure 6:
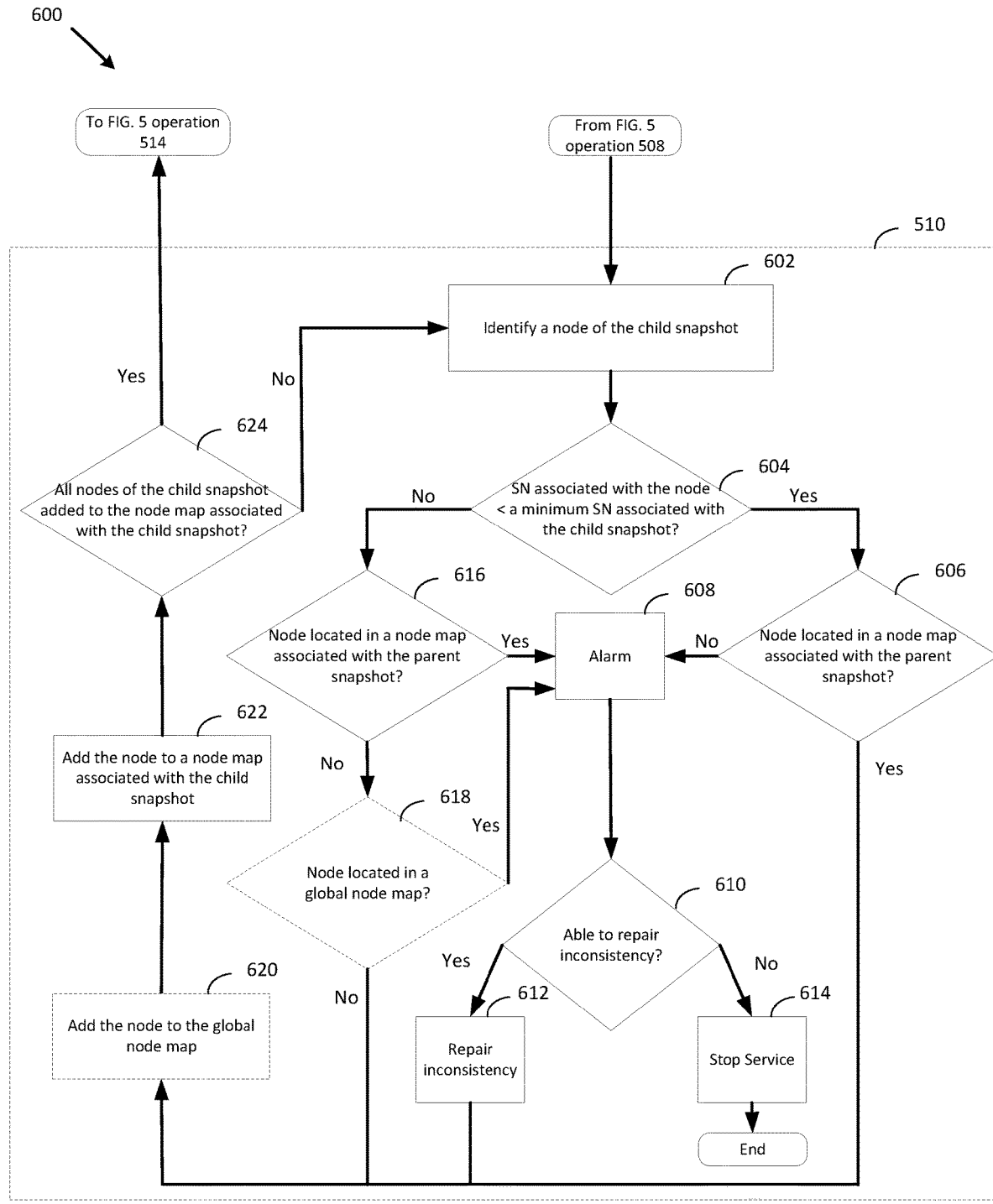
FIG. 6 is an example workflow for verifying metadata consistency of child snapshot B+ tree logical maps, according to an example embodiment of the present disclosure.

FIG. 6 is an example workflow 600 for verifying the metadata consistency of child snapshot B+ tree logical maps, according to an example embodiment of the present disclosure. In particular, FIG. 6 may provide additional detail regarding the operations performed at operation 510 in FIG. 5 for the verification of the metadata consistency of a child snapshot.

Workflow 600 may be performed by VSAN module 108, and in some cases, zDOM sub-module 132, illustrated in FIG. 1, to verify metadata consistency of snapshots in the snapshot hierarchy. As shown, FIG. 6 may begin after operation 508 illustrated in FIG. 5, by which VSAN module 108 identifies a child snapshot of a loaded snapshot. In particular, operations 602-624 may be performed to verify the metadata consistency of the child snapshot identified at operation 510.

To begin verifying the metadata consistency of a child snapshot identified at operation 508, at operation 602, VSAN module 108 identifies a node of the child snapshot. According to certain aspects, VSAN module 108 may use a top-down approach to traverse the B+ tree logical map of the child snapshot to identify a node of the child snapshot at 602. In a top-down traversal, nodes of the B+ tree logical map are analyzed starting with node(s) in a top layer of the B+ tree logical map hierarchy. Accordingly, when none of the nodes of a B+ tree logical map have been analyzed, at operation 602, the node identified for the child snapshot may be the root node of the B+ tree logical map for the child snapshot.

At operation 604, VSAN module 108 determines whether an SN associated with the node identified at operation 602 is less than a min SN associated with the child snapshot identified at operation 508. As mentioned herein, a node whose SN is smaller than an min SN associated with the snapshot may be a shared node, which VSAN module 108 may expect to find in a B+ tree logical map of a parent snapshot of the child snapshot. On the other hand, a node whose SN is equal to or larger than the min SN associated with the snapshot may not be a shared node, and VSAN module 108 may not expect to find the node in the B+ tree logical map of the parent snapshot of the child snapshot.

Accordingly, at operation 604, where VSAN module 108 determines the SN associated with the node is less than a min SN associated with the child snapshot, at operation 606, VSAN module 108 determines whether the node is located in a node map 148 in memory 114 for the loaded parent snapshot (e.g., using a physical address of the node). As mentioned, determining whether a node is located in a node map may include determining an identifier for the node is in the node map, a physical address of the node is in the node map, an SN for the node is in the node map, etc. In this case, VSAN module 108 would expect to find this node in the node map of the parent, as this node has an SN less than the SN of the min SN of the child snapshot. However, should VSAN module 108 not locate this node in the node map of the parent snapshot, at operation 608, VSAN module 108 triggers an alarm.

The alarm triggered at operation 608 may indicate that at least one inconsistency exists in the snapshot metadata. More specifically, the alarm triggered at operation 608 may indicate that an inconsistency in the snapshot logical map of the parent snapshot or the logical map of the child snapshot exists. In some embodiments, at operation 610, VSAN module 108 may determine whether the identified inconsistency is repairable and, if the inconsistency is repairable, at operation 612, the inconsistency is repaired (e.g., administrator manually fixes the metadata). In some embodiments, where, at operation 610, VSAN module 108 determines the inconsistency cannot be repaired, at operation 614, snapshot service is stopped and workflow 600 ends.

Returning back to operation 606, where VSAN module 108 determines the node is in a node map 148 in memory for the parent snapshot, VSAN module 108 may proceed to operation 622, or optionally operation 620. Prior to operation 620 and 622, the node identified at operation 602 may be considered to be verified, meaning metadata for this node has been confirmed (or fixed, where applicable).

Returning back to operation 604, where VSAN module 108 determines the SN associated with the node identified at operation 602 is not less than a min SN associated with the child snapshot (e.g., the SN of the node is≥the min SN associated with the child snapshot), at operation 616, VSAN module 108 determines whether the node is located in a node map 148 in memory 114 for the parent snapshot. In this case, VSAN module 108 would not expect to find this node in the node map 148 belonging to the parent, as this node has an SN greater than or equal to the SN of the min SN of the child snapshot. However, should VSAN module 108 locate this node in node map 148 belonging to the parent snapshot, at operation 608, VSAN module 108 triggers an alarm. Accordingly, operations 610 and 612 may be performed by VSAN module 108 to fix the inconsistency or operations 610 and 612 may be performed by VSAN module 108 to stop snapshot service and end workflow 600.

Returning back to operation 616, where VSAN module 108 determines the node is not in a node map 148 in memory 114 for the parent snapshot, VSAN module 108 may proceed to operation 622, or optionally operation 618. Optionally at operation 618, VSAN module may determine whether the node identified at operation 602 is located in a global node map 150 maintained in memory 114. Global node map 150 may include one or more nodes belonging to one or more B+ tree logical maps for one or more snapshots. Unlike node map 148 which is associated with a single snapshot, global node map 150 may be used by all snapshots in a snapshot hierarchy. While node map 148 per snapshot may be used to verify metadata consistency of nodes of a B+ tree logical map of a child snapshot of the parent snapshot, global node map 150 may be used to verify metadata consistency of nodes among sibling snapshots. For example, a node of a child snapshot which is determined to not be shared with a B+ tree logical map of the parent snapshot (e.g., an SN of the node in the child snapshot is greater than a min SN assigned to the child snapshot) may also be expected to not be shared with a B+ tree logical map of a sibling snapshot. To verify that the node is not shared with the B+ tree logical map of the sibling snapshot, VSAN module 108 may check, at operation 618, whether this unshared node (e.g., node not shared with the parent snapshot) is in global node map 150.

Where, at operation 618, VSAN module 108 determines the node is in global node map 150, at operation 608, VSAN module 108 triggers an alarm. Accordingly, operations 610 and 612 may be performed by VSAN module 108 to fix the inconsistency or operations 610 and 612 may be performed by VSAN module 108 to stop snapshot service and end workflow 600.

Alternatively, at operation 618, where VSAN module 108 determines the node is not in global node map 150, VSAN module 108 may proceed to operation 620. Prior to operation 620, the node identified at operation 602 may be considered to be verified, meaning metadata for this node has been confirmed (or fixed, where necessary).

At operation 620, VSAN module 108 may add the node to global node map 150. In certain aspects, adding the node to global node map 150 includes adding an identifier of the node (e.g., in some cases, the SN associated with the node) to global node map 150. Further, at operation 622, VSAN module 108 may add the node to a node map 148 maintained in memory 114 for the child snapshot identified at operation 508. Where no node map 148 exists in memory 114 for the child snapshot, a new node map 148 for the child snapshot may be created.

In certain aspects, where the node being added to node map 148 and/or global node map 150 (e.g., the node originally identified at operation 602) is a node determined to be shared with the parent snapshot and is the top node of a sub-tree in the B+ tree structure, nodes in the sub-tree may also be added to node map 148 and/or global node map 150 in addition to the node at the top of the sub-tree. For example, where the node identified at operation 602 is node 320 for second snapshot 204, not only would node 320 be added to node map 148 for second snapshot 202 and/or global node map 150, but nodes 330 and 332 in the sub-tree of node 320 would also be added the node map 148 for second snapshot 202 and/or global node map 150.

At operation 624, VSAN module 108 determines whether all nodes of the child snapshot have been added to the node map 148 maintained in memory 114 for the child snapshot. For example, where a B+ tree logical map for a child snapshot contains six nodes, at operation 624, VSAN module 108 determines whether six nodes have been added to node map 148. Where less than all of the nodes of the B+ tree logical map for the child snapshot are found in node map 148, VSAN module 108 returns to operation 602 where a new node of the child snapshot is identified and verified according to operations 602-622 illustrated in FIG. 6. As mentioned, the new node selected may be selected based on a top down traversal through the B+ tree logical map of the child snapshot.

Alternatively, where all of the nodes of the B+ tree logical map for the child snapshot are found in node map 148, VSAN module 108 proceeds to operation 512. As previously discussed with respect to FIG. 5, at operation 512, VSAN module 108 adds an identifier of the snapshot identified at operation 508 to queue 146 to indicate that metadata for that snapshot has been processed and verified. VSAN module 108 may then continue to perform operations illustrated in, and previously described for, FIG. 5.

Operations of workflow 600 may be described with respect to B+ tree data structure 400 illustrated in FIG. 4, and more specifically, described with respect to the verification of the metadata consistency of the B+ tree logical map for second snapshot 204 illustrated in FIG. 4.

In particular, at operation 508, VSAN module 108 may identify second snapshot 204 is a child snapshot of a snapshot which has its node map 148 maintained in memory. More specifically, a node map 148 for first snapshot 202 may be maintained in memory 114, and VSAN module 108 may identify second snapshot 204 is a child snapshot of first snapshot 202.

To begin verifying the metadata consistency of second snapshot 204, at operation 602, VSAN module 108 may identify a node of the B+ tree logical map of second snapshot 204 (e.g., one of the nodes of the B+ tree logical map for second snapshot 204 illustrated in FIG. 4). For example, at operation 602, VSAN module 108 may identify root node 402 of the B+ tree logical map for second snapshot 204 (e.g., illustrated in FIG. 4) using a top-down approach.

At operation 604, VSAN module 108 determines whether the SN associated with root node 402, e.g., S8, is less than min SN, e.g., S8, assigned to second snapshot 204. Because the SN of root node 402 is not less than the min SN assigned to second snapshot 204 (e.g., S8=S8), root node 402 may be considered to be a non-shared node, or in other words, a node owned by second snapshot 204.

Accordingly, because root node 402 is owned by second snapshot 204 and not shared with first snapshot 202, VSAN module would not expect to find the root node 402 in a node map 148 maintained for first snapshot 202 (e.g., the parent snapshot) in memory 114.

If at operation 616, VSAN module 108 locates root node 402 in node map 148 maintained for first snapshot 202, VSAN module 108 may trigger an alarm at 608. On the other hand, if at operation 616, VSAN module 108 does not locate root node 402 in node map 148 maintained for first snapshot 202, VSAN module 108 may determine that no inconsistencies exist between a B+ tree logical map for second snapshot 204 (e.g., the child snapshot) and a B+ tree logical map for first snapshot 202 (e.g., the parent snapshot).

Optionally at operation 618, VSAN module 108 may further determine whether inconsistences exist between a B+ tree logical map for second snapshot 204 and a B+ tree logical map for a sibling snapshot of second snapshot 204, for example, fourth snapshot 208. Because root node 402 is owned by second snapshot 204, VSAN module 108 would not expect to find root node 402 in a global node map 150. VSAN module 108 may not expect to find this node in global node map 150 because root node 402 is currently being verified according to operations 602-624, and according to aspects described herein, root node 402 should only get verified once (accordingly, root node 402 should not have been verified when previously traversing a sibling snapshot causing root node 402 to be added to global node map 150).

Accordingly, if at operation 618, VSAN module 108 locates root node 402 in global node map 150 maintained in memory 114, VSAN module 108 may trigger an alarm at 608. On the other hand, if at operation 618, VSAN module 108 does not locate root node 402 in global node map 150 maintained in memory 114, VSAN module 108 may determine that no inconsistencies exist between a B+ tree logical map for second snapshot 204 (e.g., the child snapshot) and first snapshot 202 (e.g., the parent snapshot), as well as between the B+ tree logical map for second snapshot 204 and fourth snapshot 208 (e.g., the sibling snapshot).

In aspects where a global node map 150 is maintained in memory 115, at operation 620, VSAN module 108 adds root node 402 to global node map 150. Further, at operation 622, VSAN module 108 adds root node 402 to a node map 148 maintained in memory 114 for second snapshot 204. Because nodes of the B+ tree logical map for second snapshot 204 have not been previously processed, at operation 622, a node map 148 may be created in memory 114 for second snapshot 204, where root node 402 is added to node map 148.

At operation 624, VSAN module 108 determines whether all nodes of the B+ tree logical map of second snapshot 204 have been added to node map 148 maintained in memory 114 for second snapshot 204. Because only root node 204 has been added to node map 148, and other nodes in second snapshot 204 have not been added to node map 148 (e.g., node 320, node 412, node 334, and node 422), VSAN module 108 returns to operation 602.

At operation 602, VSAN module 108 may identify node 320 of the B+ tree logical map for second snapshot 204 is the next node to be verified (e.g., using a top-down approach). The SN associated with node 320 is S2, and VSAN module 108 may determine, at operation 604, that S2 is less than the min SN assigned to second snapshot 204 (e.g., S2<S8). Because the SN of node 320 is less than the min SN assigned to second snapshot 204, VSAN module 108 may determine node 320 is a shared node and verify, at operation 606, that node 320 is located in a node map 148 maintained in memory 114 for the parent.

At operation 606, VSAN module may either determine node 320 is not in node map 148 maintained in memory 114 for first snapshot 202 and trigger an alarm to fix the inconsistency or determine node 320 is in node map 148 maintained in memory 114 for first snapshot 202 and proceed to operation 622 (or optionally operation 620). At operation 620, VSAN module 108 may optionally add node 320, as well as node 330 and node 332 (e.g., nodes in the sub-tree of node 320), to global node map 160. Further, at operation 622, VSAN module 108 may add node 320, as well as node 330 and node 332, to node map 148 maintained in memory 114 for second snapshot 204.

At this point, because only root node 402 and node 320 have been added to node map 148, and other nodes in second snapshot 204 have not been added to node map 148 (e.g., node 412, node 334, and node 422), VSAN module 108 returns to operation 602 and performs operations 602-624 for each of these nodes.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for verifying consistency of snapshot metadata maintained in an ordered data structure for a plurality of snapshots in a snapshot hierarchy, the method comprising:
   identifying a first plurality of nodes maintained in a first ordered data structure for a first snapshot in the snapshot hierarchy that is a child of a second snapshot in the snapshot hierarchy;
   for a first node of the first plurality of nodes, verifying the first node by checking for the first node in a second node map maintained in memory for the second snapshot, wherein the second node map includes a plurality of verified nodes in a second ordered data structure of the second snapshot; and
   based on whether the first node is in the second node map:
      adding the first node to a first node map maintained in the memory for the first snapshot, wherein the first node map includes verified nodes of the first plurality of nodes; or
      triggering an alarm.

2. The method of claim 1, further comprising:
   selecting the first snapshot of the plurality of snapshots in the snapshot hierarchy for verification of the first plurality of nodes according to a breadth first traversal starting at a root snapshot of the snapshot hierarchy.

3. The method of claim 2, further comprising:
   after verifying nodes of each child snapshot of the second snapshot, removing the second node map from the memory; and
   selecting a next snapshot of the plurality of snapshots in the snapshot hierarchy for verification of a second plurality of nodes in a third ordered data structure for the next snapshot according to the breadth first traversal,
   wherein verification of the second plurality of nodes includes checking for nodes of the second plurality of nodes in the first node map maintained in memory for the first snapshot.

4. The method of claim 1, wherein the first plurality of nodes include, at least one of: one or more nodes owned by the first snapshot or one or more nodes shared between the first snapshot and the second snapshot and verifying the first node by checking for the first node in the second node map maintained in the memory for the second snapshot comprises:
   when the first node is owned by the first snapshot, verifying that the first node is not located in the second node map maintained in the memory for the second snapshot; and
   when the first node is shared between the first snapshot and the second snapshot, verifying that the first node is located in the second node map maintained in the memory for the second snapshot.

5. The method of claim 4, further comprising:
   determining the first node is owned by the first snapshot by determining a sequence number (SN) assigned to the first node is greater than or equal to a minimum SN assigned to first ordered data structure for the first snapshot; or
   determining the first node is shared between the first snapshot and the second snapshot by determining the SN assigned to the first node is less than the minimum SN assigned to the first ordered data structure for the first snapshot, wherein the minimum SN assigned to the first ordered data structure is equal to a smallest SN value assigned to a node of the first plurality of nodes in the first ordered data structure.

6. The method of claim 1, wherein verifying the first node further comprises:
   checking for the first node in a global node map maintained in the memory, wherein the global node map maintained in the memory includes, at least one of, the plurality of verified nodes in the second ordered data structure of the second snapshot and a third plurality of nodes in a third ordered data structure for a third snapshot that is a child of the second snapshot in the snapshot hierarchy, wherein adding the first node to the first node map maintained in the memory is further based on not finding the first node in the global node map.

7. The method of claim 1, wherein:
   the first ordered data structure for the first snapshot and the second ordered data structure for the second snapshot comprise B+ tree logical maps used to manage logical extents for logical to physical address mapping for each snapshot.

8. A system comprising:
   one or more processors; and
   at least one memory, the one or more processors and the at least one memory configured to:
   identify a first plurality of nodes maintained in a first ordered data structure for a first snapshot in a snapshot hierarchy that is a child of a second snapshot in the snapshot hierarchy;
   for a first node of the first plurality of nodes, verify the first node by checking for the first node in a second node map maintained in memory for the second snapshot, wherein the second node map includes a plurality of verified nodes in a second ordered data structure of the second snapshot; and based on whether the first node is in the second node map:
add the first node to a first node map maintained in the memory for the first snapshot, wherein the first node map includes verified nodes of the first plurality of nodes; or
trigger an alarm.

9. The system of claim 8, wherein the one or more processors and the at least one memory are further configured to:
select the first snapshot of a plurality of snapshots in the snapshot hierarchy for verification of the first plurality of nodes according to a breadth first traversal starting at a root snapshot of the snapshot hierarchy.

10. The system of claim 9, wherein the one or more processors and the at least one memory are further configured to:
after verifying nodes of each child snapshot of the second snapshot, remove the second node map from the memory; and
select a next snapshot of the plurality of snapshots in the snapshot hierarchy for verification of a second plurality of nodes in a third ordered data structure for the next snapshot according to the breadth first traversal,
wherein verification of the second plurality of nodes includes checking for nodes of the second plurality of nodes in the first node map maintained in memory for the first snapshot.

11. The system of claim 8, wherein the first plurality of nodes include, at least one of: one or more nodes owned by the first snapshot or one or more nodes shared between the first snapshot and the second snapshot and verifying the first node by checking for the first node in the second node map maintained in the memory for the second snapshot comprises:
when the first node is owned by the first snapshot, verifying that the first node is not located in the second node map maintained in the memory for the second snapshot; and
when the first node is shared between the first snapshot and the second snapshot, verifying that the first node is located in the second node map maintained in the memory for the second snapshot.

12. The system of claim 11, wherein the one or more processors and the at least one memory are further configured to:
determine the first node is owned by the first snapshot by determining a sequence number (SN) assigned to the first node is greater than or equal to a minimum SN assigned to first ordered data structure for the first snapshot; or
determine the first node is shared between the first snapshot and the second snapshot by determining the SN assigned to the first node is less than the minimum SN assigned to the first ordered data structure for the first snapshot, wherein the minimum SN assigned to the first ordered data structure is equal to a smallest SN value assigned to a node of the first plurality of nodes in the first ordered data structure.

13. The system of claim 8, wherein the one or more processors and the at least one memory are further configured to verify the first node by:
checking for the first node in a global node map maintained in the memory, wherein the global node map maintained in the memory includes, at least one of, the plurality of verified nodes in the second ordered data structure of the second snapshot and a third plurality of nodes in a third ordered data structure for a third snapshot that is a child of the second snapshot in the snapshot hierarchy, wherein adding the first node to the first node map maintained in the memory is further based on not finding the first node in the global node map.

14. The system of claim 8, wherein:
the first ordered data structure for the first snapshot and the second ordered data structure for the second snapshot comprise B+ tree logical maps used to manage logical extents for logical to physical address mapping for each snapshot.

15. A non-transitory computer-readable medium comprising instructions that, when executed by one or more processors of a computing system, cause the computing system to perform operations for verifying consistency of snapshot metadata maintained in an ordered data structure for a plurality of snapshots in a snapshot hierarchy, the operations comprising:
identifying a first plurality of nodes maintained in a first ordered data structure for a first snapshot in the snapshot hierarchy that is a child of a second snapshot in the snapshot hierarchy;
for a first node of the first plurality of nodes, verifying the first node by checking for the first node in a second node map maintained in memory for the second snapshot, wherein the second node map includes a plurality of verified nodes in a second ordered data structure of the second snapshot; and
based on whether the first node is in the second node map:
adding the first node to a first node map maintained in the memory for the first snapshot, wherein the first node map includes verified nodes of the first plurality of nodes; or
triggering an alarm.

16. The non-transitory computer-readable medium of claim 15, wherein the operations further comprise:
selecting the first snapshot of the plurality of snapshots in the snapshot hierarchy for verification of the first plurality of nodes according to a breadth first traversal starting at a root snapshot of the snapshot hierarchy.

17. The non-transitory computer-readable medium of claim 16, wherein the operations further comprise:
after verifying nodes of each child snapshot of the second snapshot, removing the second node map from the memory; and
selecting a next snapshot of the plurality of snapshots in the snapshot hierarchy for verification of a second plurality of nodes in a third ordered data structure for the next snapshot according to the breadth first traversal,
wherein verification of the second plurality of nodes includes checking for nodes of the second plurality of nodes in the first node map maintained in memory for the first snapshot.

18. The non-transitory computer-readable medium of claim 15, wherein the first plurality of nodes include, at least one of: one or more nodes owned by the first snapshot or one or more nodes shared between the first snapshot and the second snapshot and verifying the first node by checking for the first node in the second node map maintained in the memory for the second snapshot comprises:
when the first node is owned by the first snapshot, verifying that the first node is not located in the second node map maintained in the memory for the second snapshot; and
when the first node is shared between the first snapshot and the second snapshot, verifying that the first node is located in the second node map maintained in the memory for the second snapshot.

19. The non-transitory computer-readable medium of claim 18, wherein the operations further comprise:
   determining the first node is owned by the first snapshot by determining a sequence number (SN) assigned to the first node is greater than or equal to a minimum SN assigned to first ordered data structure for the first snapshot; or
   determining the first node is shared between the first snapshot and the second snapshot by determining the SN assigned to the first node is less than the minimum SN assigned to the first ordered data structure for the first snapshot, wherein the minimum SN assigned to the first ordered data structure is equal to a smallest SN value assigned to a node of the first plurality of nodes in the first ordered data structure.

20. The non-transitory computer-readable medium of claim 15, wherein verifying the first node further comprises:
   checking for the first node in a global node map maintained in the memory, wherein the global node map maintained in the memory includes, at least one of, the plurality of verified nodes in the second ordered data structure of the second snapshot and a third plurality of nodes in a third ordered data structure for a third snapshot that is a child of the second snapshot in the snapshot hierarchy, wherein adding the first node to the first node map maintained in the memory is further based on not finding the first node in the global node map.

* * * * *